United States Patent
Hejmady

(10) Patent No.: US 10,949,067 B2
(45) Date of Patent: Mar. 16, 2021

(54) APPARATUS AND METHOD OF DISPLAYING OBJECTS IN CONFIGURABLE WINDOW GROUPS

(71) Applicant: Hexagon Technology Center GmbH, Heerbrugg (CH)

(72) Inventor: Prateek Hejmady, Cherry Hill, NJ (US)

(73) Assignee: Hexagon Technology Center GmbH, Heerbrugg (CH)

( * ) Notice: Subject to any disclaimer, the term of this patent is extended or adjusted under 35 U.S.C. 154(b) by 1003 days.

(21) Appl. No.: 14/725,436

(22) Filed: May 29, 2015

(65) Prior Publication Data

US 2015/0346965 A1    Dec. 3, 2015

Related U.S. Application Data

(60) Provisional application No. 62/004,427, filed on May 29, 2014.

(51) Int. Cl.
*G06F 3/0484* (2013.01)
*G06F 3/0486* (2013.01)
(Continued)

(52) U.S. Cl.
CPC ........ *G06F 3/04842* (2013.01); *G06F 3/0481* (2013.01); *G06F 3/0486* (2013.01);
(Continued)

(58) Field of Classification Search
CPC ............. G06F 3/04842; G06F 3/04817; G06F 17/30905; G06F 3/0481; G06F 9/4443;
(Continued)

(56) References Cited

U.S. PATENT DOCUMENTS

| 5,856,826 A | 1/1999 | Craycroft ..................... 345/346 |
| 6,072,486 A * | 6/2000 | Sheldon ................ G06F 3/0481 715/835 |

(Continued)

FOREIGN PATENT DOCUMENTS

| JP | 2009 169545 | 7/2009 | ............. G06F 3/048 |
| WO | WO 2009/086631 A1 | 7/2009 | ............... G09G 5/00 |

OTHER PUBLICATIONS

European Patent Office Authorized Officer: Alonso, Goicolea, L., Notification of Transmittal of the International Search Report and The Written Opinion of the International Searching Authority, or the Declaration, PCT/US2015/033222, dated Oct. 7, 2015, 10 pages.

*Primary Examiner* — Nicholas Klicos
(74) *Attorney, Agent, or Firm* — Nutter McClennen & Fish LLP

(57) ABSTRACT

A method of displaying objects of an application executes the application on a computer system. The application is configured to generate a plurality of application windows, and at least one of those application windows has indicia representing an object of something being developed by the application. The method then displays first and second application windows in a first window group on one or more monitors, and drags the second application window into a second window group to produce a given layout across the first and second window groups. In this case, the first application window remains in the first window group. The two application windows preferably are produced by a single instance of the application.

23 Claims, 17 Drawing Sheets

(51) Int. Cl.
  *G06F 3/0481* (2013.01)
  *G06F 16/957* (2019.01)
(52) U.S. Cl.
  CPC ...... *G06F 3/04817* (2013.01); *G06F 16/9577* (2019.01); *G06F 2203/04806* (2013.01)
(58) Field of Classification Search
  CPC .. G06F 3/0486; G06F 3/04886; G06F 17/212; G06F 21/36; G06F 3/00; G06F 3/01; G06F 3/04847; G06F 3/04815; G06F 3/048; G06F 17/30855; G06F 17/30781; G06F 17/30846; G06F 17/30014; G06F 17/30174; G06F 17/30129; G06F 17/30067; G06F 17/30575; G06F 17/30017; G06F 17/30058; G06F 17/30; G06F 9/451
  See application file for complete search history.

(56) References Cited

U.S. PATENT DOCUMENTS

| | | | | |
|---|---|---|---|---|
| 6,232,972 B1 * | 5/2001 | Arcuri | ................... | G06F 9/453 715/815 |
| 6,756,999 B2 * | 6/2004 | Stoakley | ............... | G06F 3/0481 715/764 |
| 8,769,428 B2 * | 7/2014 | Mir | ........................ | G06F 9/452 715/779 |
| 2002/0075244 A1 * | 6/2002 | Tani | ................... | G05B 23/0216 345/173 |
| 2005/0223334 A1 | 10/2005 | Guido et al. | ................... | 715/794 |
| 2005/0289478 A1 * | 12/2005 | Landman | ............... | G06F 3/048 715/804 |
| 2007/0266336 A1 * | 11/2007 | Nojima | ................. | G06F 3/0486 715/792 |
| 2009/0100368 A1 * | 4/2009 | Look | .................... | G06F 3/0481 715/775 |
| 2011/0078624 A1 * | 3/2011 | Missig | ................ | G06F 3/04883 715/802 |
| 2011/0173556 A1 * | 7/2011 | Czerwinski | ........... | G06F 3/0481 715/771 |
| 2011/0202860 A1 * | 8/2011 | Tsai | ..................... | G06F 3/0488 715/769 |
| 2011/0276908 A1 * | 11/2011 | O'Riordan | ............. | G06F 9/451 715/763 |
| 2012/0246596 A1 * | 9/2012 | Ording | .................... | G06F 9/451 715/799 |
| 2014/0101579 A1 | 4/2014 | Kim et al. | ..................... | 715/761 |
| 2014/0258914 A1 * | 9/2014 | Mir | ....................... | G06F 3/0484 715/779 |
| 2014/0282229 A1 * | 9/2014 | Laukkanen | ........... | G06F 3/0481 715/788 |
| 2015/0169285 A1 * | 6/2015 | Reyes | .................... | G06F 3/167 715/728 |

* cited by examiner

Primary Monitor — 14

Secondary Monitor — 16

Primary Monitor — 14

Secondary Monitor — 16

APPARATUS AND METHOD OF DISPLAYING OBJECTS IN CONFIGURABLE WINDOW GROUPS

RELATED APPLICATIONS

The present U.S. patent application is related to and claims priority from U.S. Provisional Patent Application 62/004,427 filed on May 29, 2014 entitled "Apparatus and Method of Displaying Objects of a Builder Application", which is incorporated herein by reference in its entirety.

FIELD OF THE INVENTION

The invention generally relates to the display of windows in configurable window groups and more particularly the invention relates to configurable window groups for use with a plurality of monitors

BACKGROUND OF THE INVENTION

Builder applications are used as systematic engineering tools to direct and produce large scale building projects, such as industrial plants, ocean tankers, or high rise buildings. One example of such an application is the Intergraph Smart™ 3D, distributed by Intergraph Corporation of Huntsville, Ala. In short, this application implements a comprehensive product suite that facilitates project execution, handover, and plant operational efficiency. Workflows with the application ensure best practices and efficient building processes.

When using a builder application, an operator may have windows opened in multiple monitors. However, the windows operate independently and users of complex programs do not have the ability to configure and coordinate the windows.

SUMMARY OF VARIOUS EMBODIMENTS

In accordance with one embodiment of the invention, a method of displaying objects of a builder application executes the builder application on a computer system. The builder application is configured to generate a plurality of application windows, and at least one of those application windows has indicia representing an object of something being developed by the builder application. The method then displays first and second application windows in a first window group on one or more monitors, and drags the second application window defining a second window group to produce a given layout across the first and second window groups. In this case, the first application window remains in the window group. The two application windows preferably are produced by a single instance of the builder application.

The method can save the given layout in memory. In that case, the method may change the layout, and select prescribed indicia (e.g., a button) displayed on the one or more monitors to recall the given layout from memory for display. In one implementation, the one or more monitors includes a first monitor and a second monitor, where the first window group is on the first monitor, and the second window group is on the second monitor. Alternatively, the first and second window groups may be on separate regions of the first monitor.

The computer may have a given database storing and managing information relating to the given layout. The two application windows thus preferably are displayed using data from the given database. For example, the two application windows may display a common object. Next, the method may change the appearance of the object on the first application window. In a corresponding manner, the appearance of the object also may change in the second application window without user selection of the object in the second window.

Some embodiments drag a third application window into the second window group to produce a new layout having a plurality of application windows. The application windows on the second window group are grouped into a single unit. To simplify the management of the windows, the single unit has a boundary, and the method displays a shell circumscribing the boundary of the single unit. In addition or alternatively, during use, the single unit may be configured to collapse and expand all its application windows at the same time, and/or permit a user to drag all its application windows in a single cursor movement across a monitor.

The first application window may have indicia representing an object, while the second application window has a toolbar or pallette. Moreover, among other things, the builder application can include an application to build a structure (e.g., a power plant), where the object has at least a component of the structure.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a computer system executing a single instance of a builder application has multiple window groups across which windows of that application instance may be dragged. Different layout arrangements of the windows for multiple window groups may be saved and recalled for future use. Multiple windows in a single window group then may be controlled as a single unit, thus permitting them to be simultaneously minimized and maximized, or dragged to another location on its respective monitor. Details of illustrative embodiments are discussed below.

Figure 1:
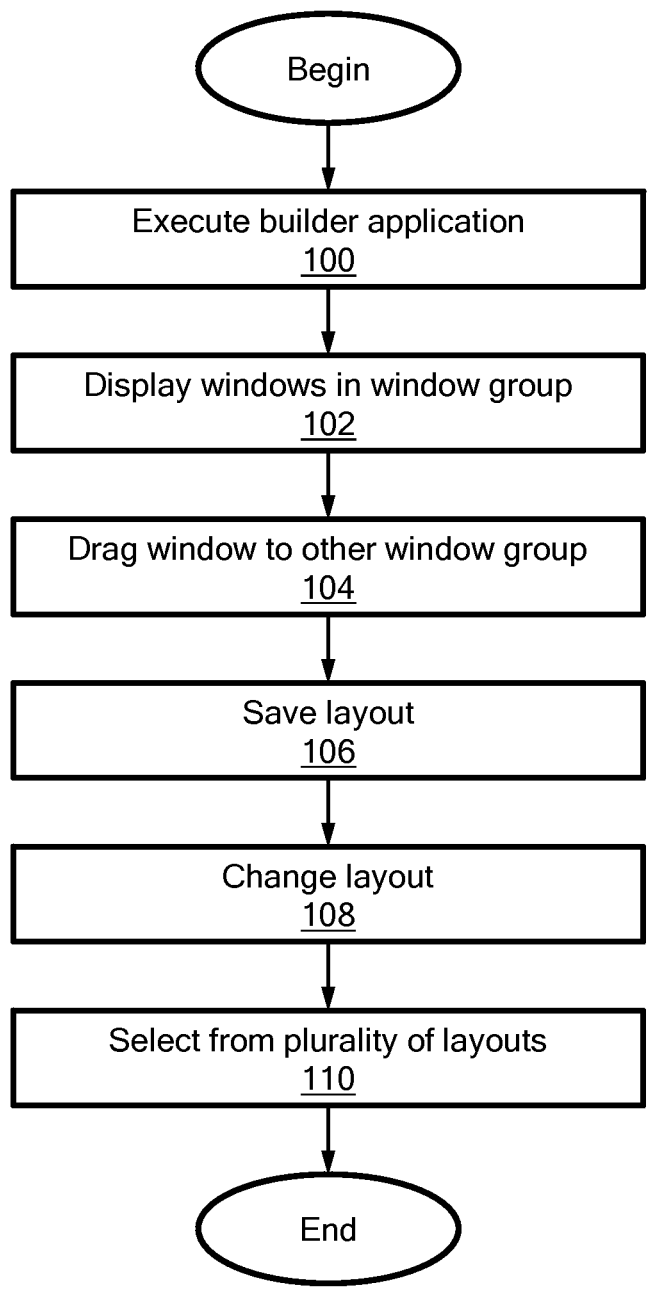
FIG. 1 shows a method of controlling windows to form window groups.

To those ends, FIG. 1 shows a method of controlling windows to define one or more window groups. This method is a simplified version of what can be a much longer and detailed process. Accordingly, those skilled in the art can add steps, modify steps, replace steps, change the order of steps, or perform similar processes and still remain within the spirit and scope of various embodiments of the invention. FIGS. 2 through 7D illustrate the execution of certain steps of this method. It nevertheless should be noted, however, that these latter figures are very specific examples and not intended to limit all embodiments. For example, these figures may show specific company names (e.g., "Intergraph"), specific layouts, and specific designs, among other things, which are by no means intended to limit all embodiments of the invention. These figures therefore merely are illustrative to prove aid in the understanding of various embodiments.

The process begins at step 100, which executes a conventional builder application. Specifically, as known by those skilled in the art and noted above, users or builders use builder applications as systematic engineering tools to direct and produce large scale building projects, such as industrial plants, ocean tankers, or high rise buildings. A builder application is used herein as an illustrative example of a complex application program for which a user would like to have configurable window groups and the ability to save and retrieve layouts that include the window groups. The present invention should not be considered to be limited solely to builder applications.

To provide more versatility and control to the user, illustrative embodiments generate multiple "window groups" which were referred to within the U.S. provisional application 62/004,427 as "monitor spaces" in a single system. The use of the term "window group" in place of "monitor space" is done for clarity and does not deviate from the definition within the provisional application. Specifically, one or more windows that together effectively act as a single unit or as a single window may be considered to form a window group 12. Like a single window 10, the windows 10 within a single window group 12 may be dragged together in a single mouse or cursor movement without changing their positions relative to each other, maximized in a single mouse click, or minimized in a single mouse click (discussed below). This is in contrast to multiple separate adjacent or overlapping windows that each require separate dragging, minimization, and maximization. To aid the user, some embodiments form a visual boundary or shell around a window group, thus providing the visual appearance of a single monitor having multiple windows.

Figure 2:
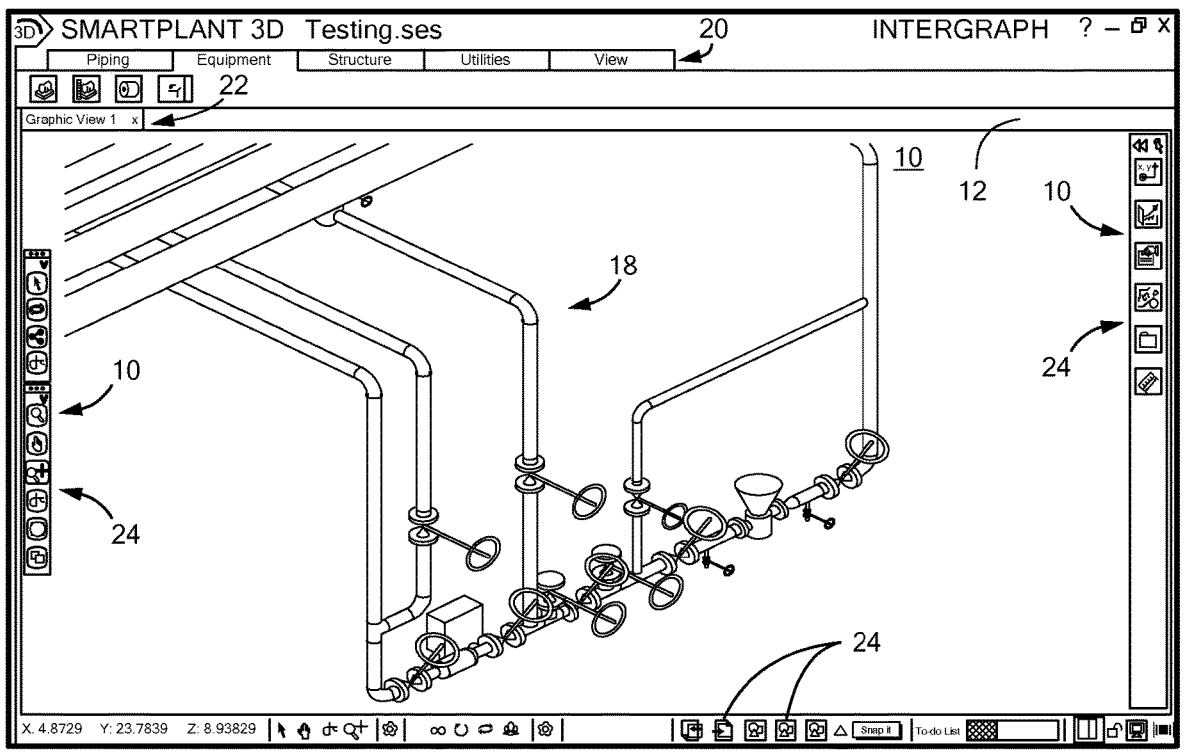
FIG. 2 schematically shows a multi-monitor system displaying windows in a single monitor (e.g., step 102).

FIG. 2 shows a single window group 12 having three windows 10, and a computer system having two monitors. Among other things, the builder application may be executed on a computer system having a single monitor only, two monitors, three monitors, or even more monitors. Multiple window groups 12 thus may be positioned on a single monitor, or across multiple monitors.

Accordingly, the process continues to step 102, which displays windows 10 in one or more window groups. FIG. 2 and other figures schematically show various arrangements of windows 10 within different window groups 12 across one or more monitors. Specifically, the example shown in FIG. 2 displays a first monitor ("primary monitor 14") having three different windows 10 a single window group 12 (the upper side of the figure), and a second monitor 16 displaying no windows 10 or window groups 12 (the lower side of the figure).

One of the windows 10, which may be considered the main window 10 of the window group 12, displays at least a portion of the structure 18 or object (also identified by reference number "18") being processed. In particular, the user may be building and/or modifying a specific part (e.g., a valve) of a larger object 18 or structure 18 (e.g., a piping system). For example, as shown in FIG. 2, this window 10 may have multiple main tabs 20 showing different portions or different features of a larger structure 18 being developed. The user therefore simply selects one of the main tabs 20 to display and/or modify the portion identified in the main tab 22. As an example, the different portions of the structure 18 identified by the main tabs 22 are "piping," "equipment," "structure," "utilities," and "view." Indeed, those skilled in the art can configure the builder application to show tabs for any portions of the structure 18. Accordingly, those tab designations are illustrative and not intended to be limiting.

Selection of one of the main tabs 20 displays the relevant portion of the system; sometimes a selected tab 20 displays buttons 24 or a palette for processing that particular part of the structure 18. In other embodiments, buttons 24 remain static across two or more different main tabs 20. The main window 10 shown in FIG. 2 displays indicia representing equipment, which may be part of the piping system. Additional details of the piping system may be viewed by selecting the piping tab 20, or one of the other tabs.

This main window 10 has one or more sub-tabs 22, one of which is identified as "Graphic View 1." The user thus may use the tabs to switch between multiple "equipment" images being processed within that single window 10. As noted above, buttons 24 associated with the window 10 may be used to display or modify some portion of the structure 18. To that end, the figure shows various sets of buttons 24 that enable user to modify the structure 18. As discussed in greater detail below, two of the sets of buttons 24 (e.g., pallettes or toolbars) each are considered to form a window 10 that itself may be manipulated in a manner similar to the main window 10.

Figure 3A:
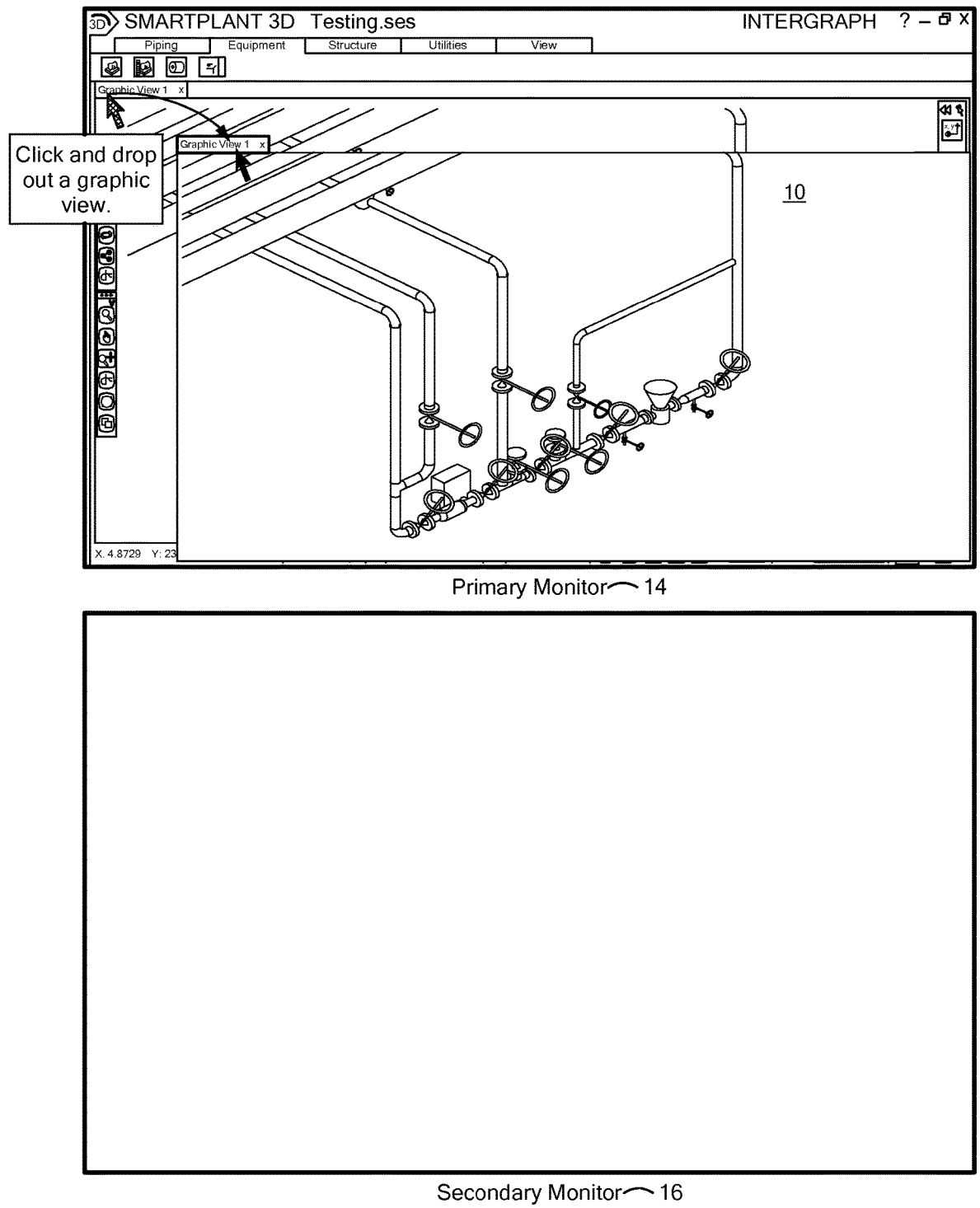
FIGS. 3A and 3B schematically show a multi-monitor system executing the method of FIG. 1 and demonstrating movement of a window to form a second window group (step 104).
Figure 3B:
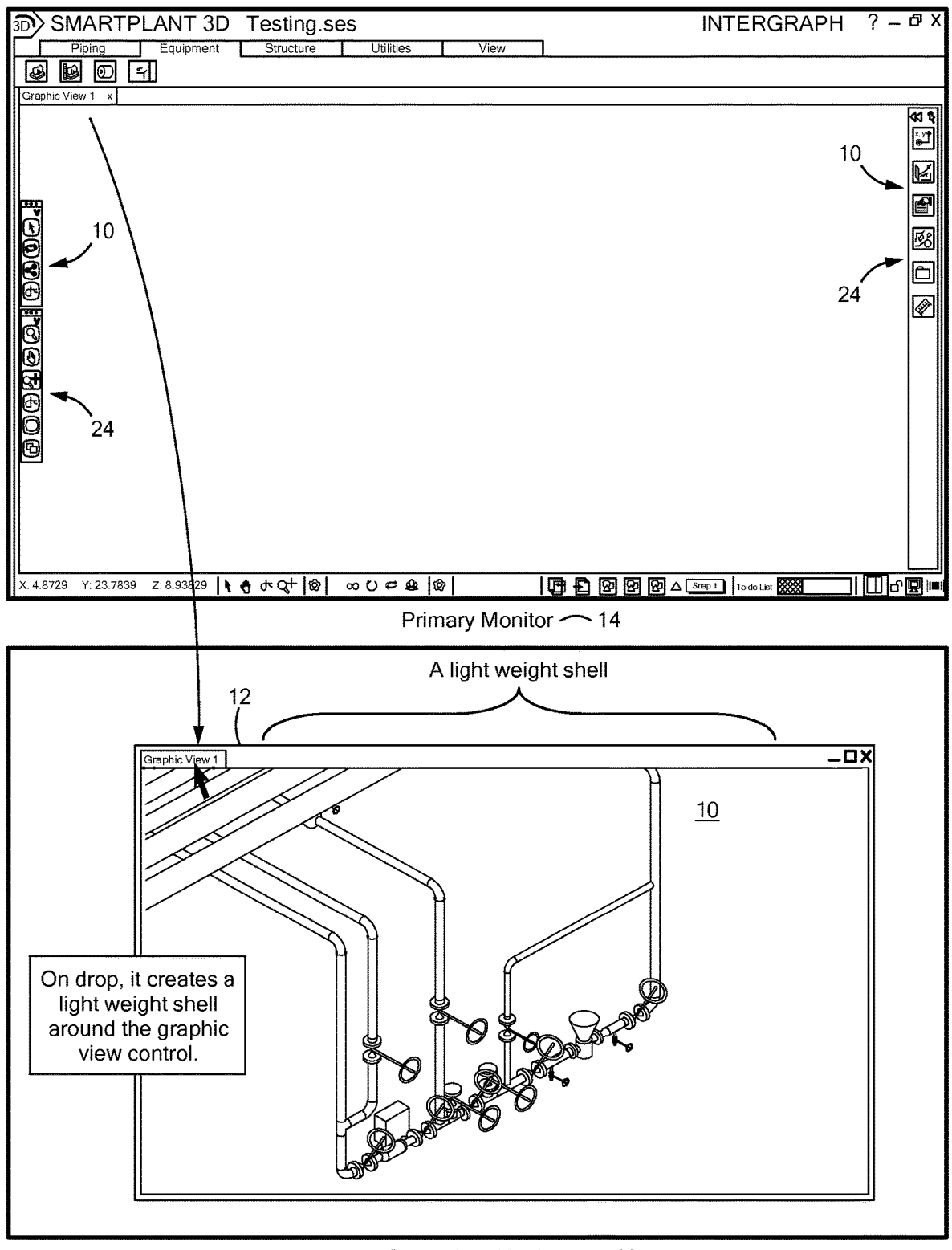

The process continues to step 104, in which a user drags a window 10 to another window group 12. To those ends, FIGS. 3A and 3B schematically show how a user moves a window 10 from a first window group 12 to a second window group 12. To that end, the user must select and hold a prescribed portion of the window 10 being moved to not move the entire window group 12. In this case, the user mouse clicks and holds the appropriate sub-tab 22, which in this case recites "Graphic View 1" (FIG. 3A), and drags the window 10 from the first window group 12 to a second window group 12. Those skilled in the art may display other indicia for selecting to drag, or permit dragging by contacting other portions of the windows 10. It should be understood that the window groups may be preconfigured, such that a first group is defined on a first monitor and a second window group is defined on a second monitor, and thus by dragging a window to a second monitor, the window becomes associated with the second window group. Thus, the position and bounds of the window group is preconfigured by the user or set as a default. In alternative embodiments, the creation of a window group is under the operational control of the end user. Thus, the window groups are configurable and the user must execute a command instruction in order to indicate that a new window group is to be created. For example, the computer code may require the user to enter/press a function key (F1-F12) or other key combination to indicate that a new window group is being created as the result of selecting a window and moving the application window. The underlying computer code can also let the user define the position or size of the second window group. For example, the computer code can be configured to offer choices to the user such as splitting a monitor into two halves either vertically or horizontally so that each half is a separate window group or having each monitor in a multiple-monitor configuration be designated as a separate window group. The computer code can also be configured to allow a user to select an arbitrary region of a display as a separate window group. For example, a user may designate by using a pointing device a region on a screen or one or more screens to be a window group wherein the user moves from a first position designated with a click/key press to a second position designated with a second click/key press in which a rectangular section of the monitor space forms the window group.

The second window group 12 of FIGS. 3A and 3B is on the second monitor 16. This embodiment also forms an optional shell (sometimes referred to as a "lightweight shell") that circumscribes this new window group 12 (FIG. 3B). Accordingly, at this point, the system now displays two window groups 12—the window group 12 on the primary monitor 14 having the two remaining windows 10 with toolbars/buttons 24, and the window group 12 on the second monitor 16 showing the structure 18 being processed.

Figure 4A:
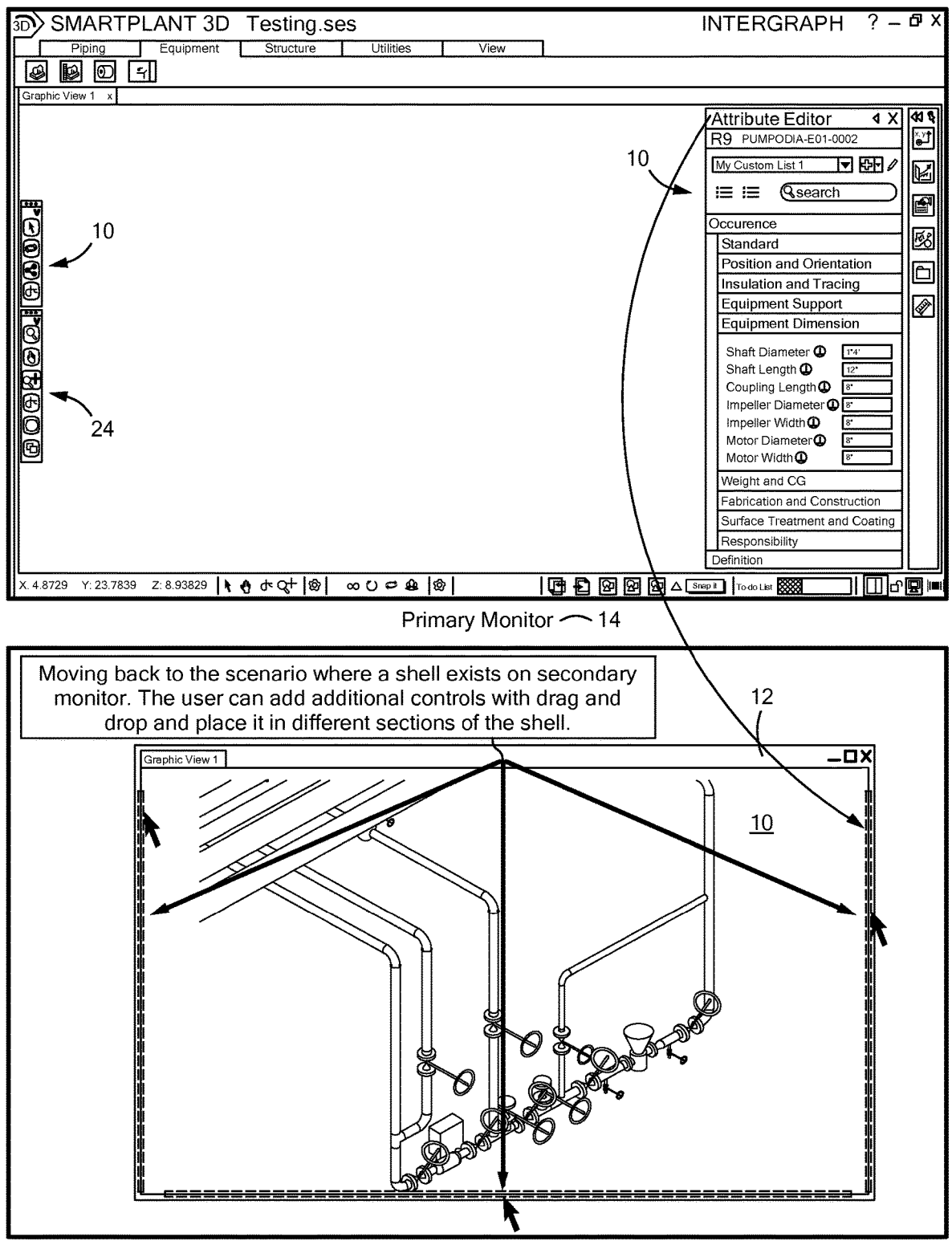
FIGS. 4A and 4B schematically show a multi-monitor system executing the method of FIG. 1 and demonstrating movement of a control window to the window to the second window group (e.g., step 104).
Figure 4B:
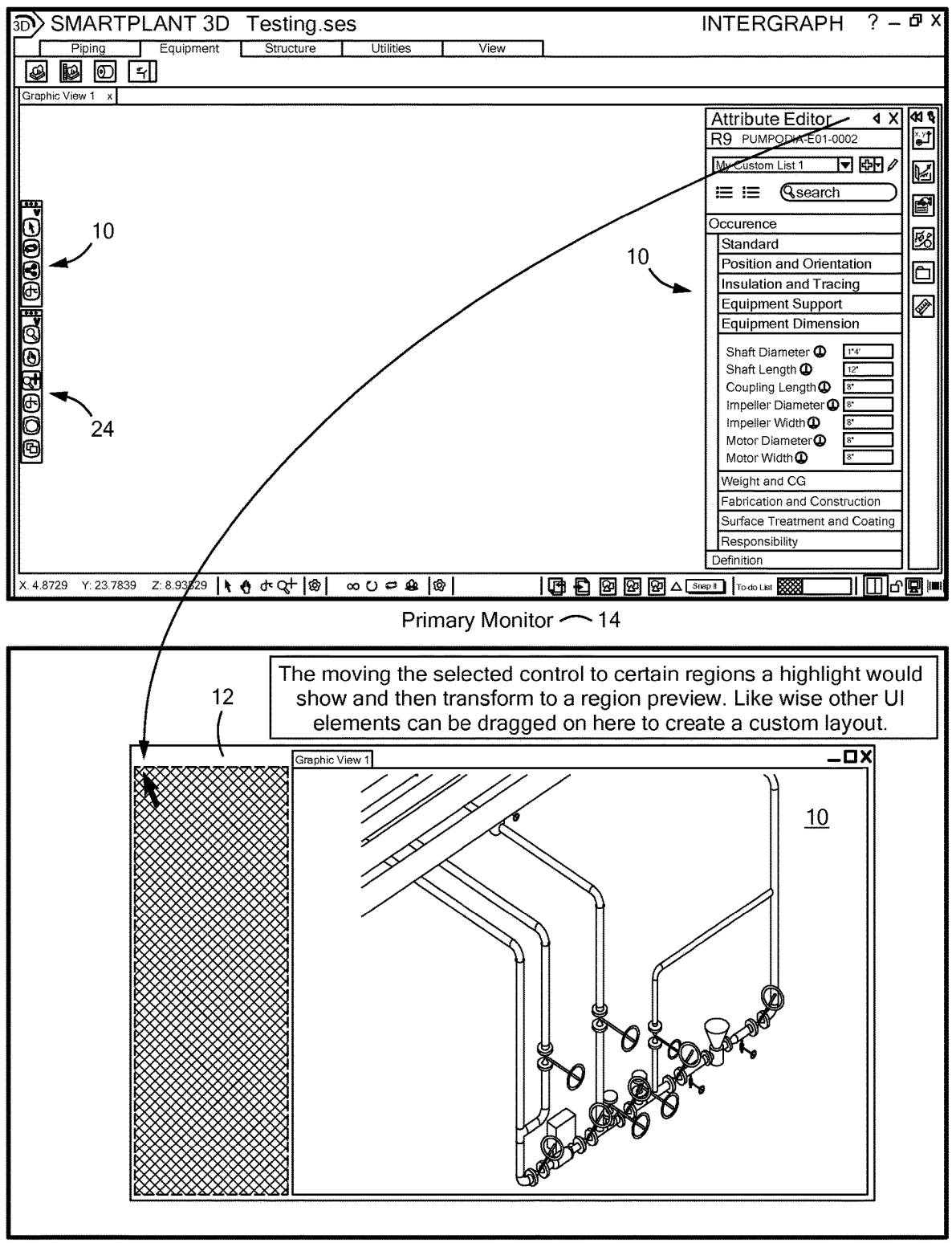

The user may move additional windows 10 to the second window group 12. For example, in FIGS. 4A and 4B, a user drags an attribute editor window 10 from the first window group 12 to the second window group 12 having a window 10 showing the equipment/structure 18. As shown in FIG. 4B, the attribute editor window 10 docks to the left side of the window 10 on the second window group 12.

Figure 5A:
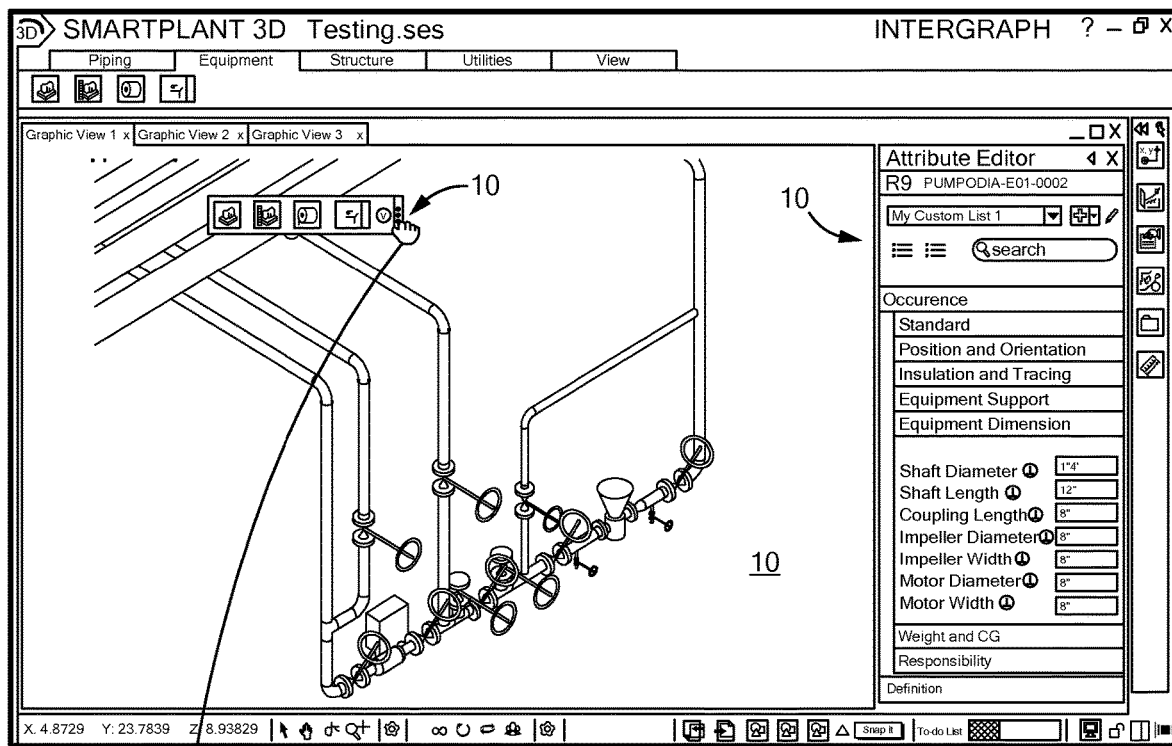
FIGS. 5A and 5B schematically show a multi-monitor system executing the method of FIG. 1 and demonstrating movement of another control window to a second window group (e.g., step 104).
Figure 5A:
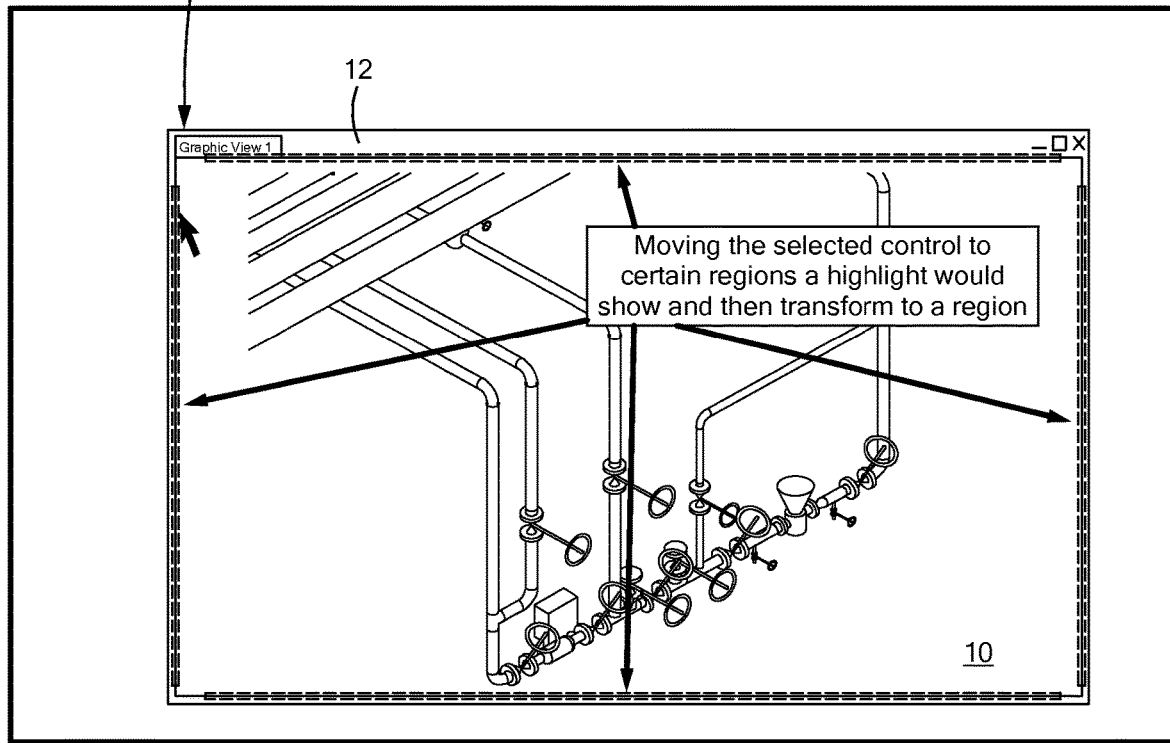
Figure 5B:
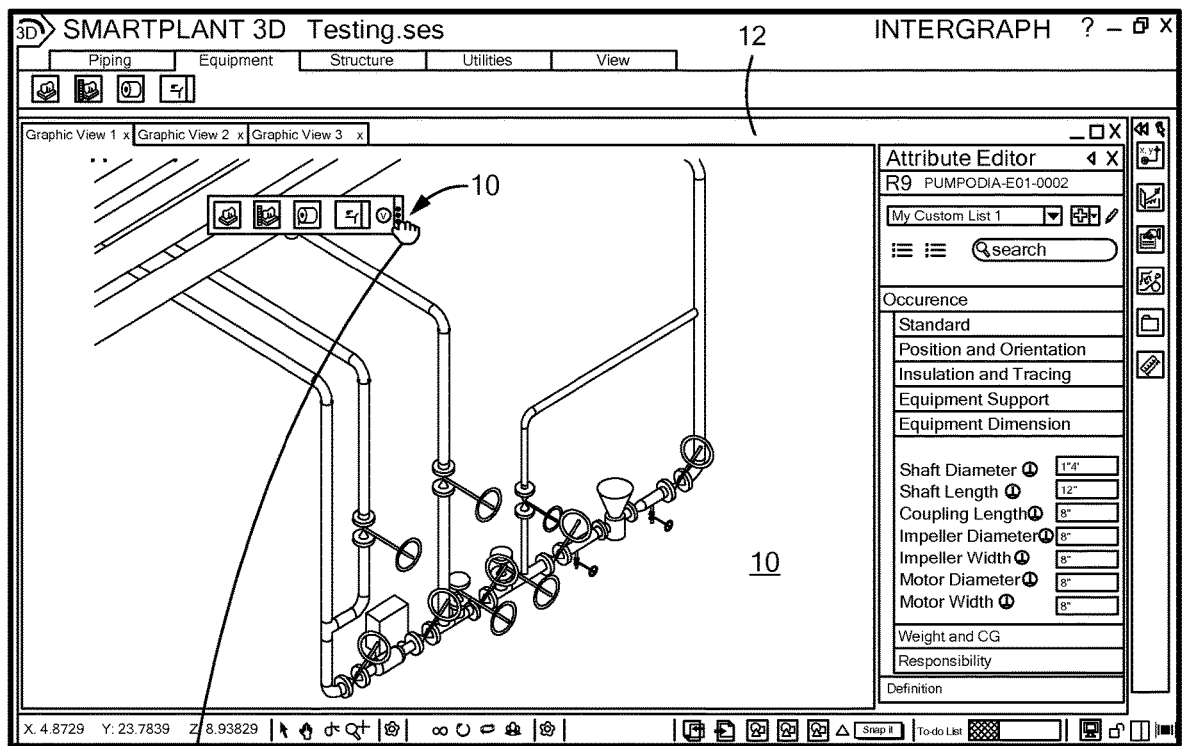
Figure 5B:
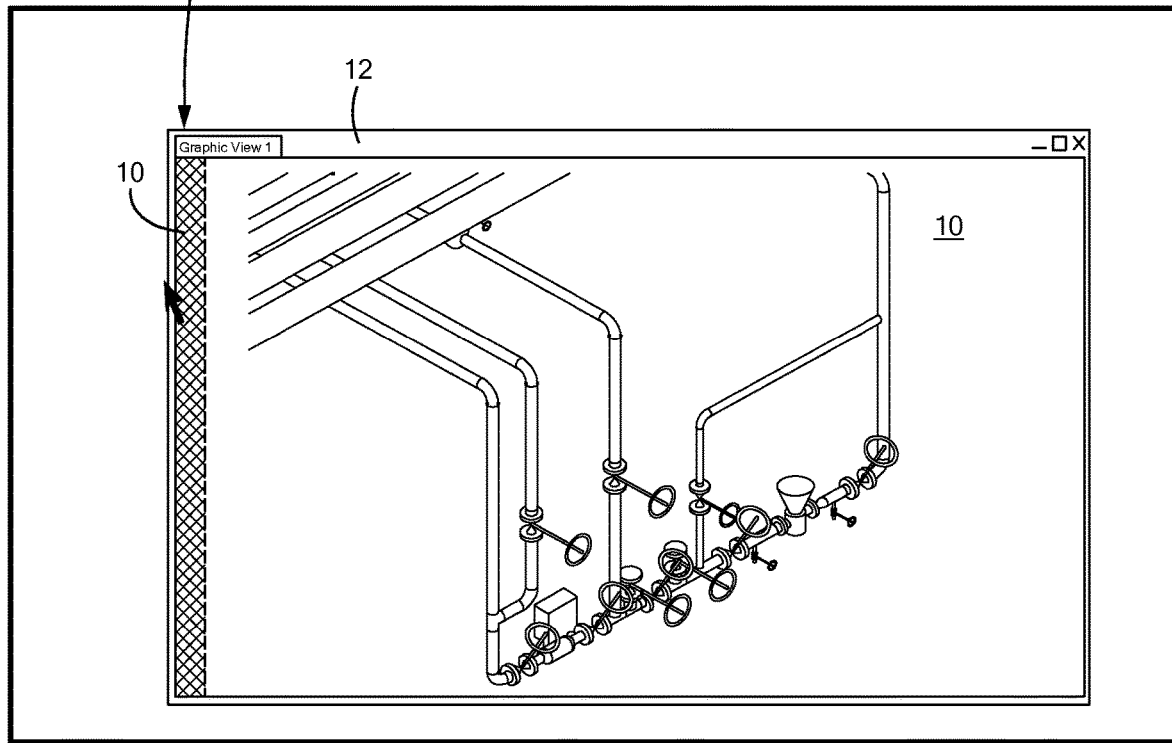

Indeed, the user can select other places to position the windows 10 in the second window group 12. For example, rather than docking the attribute editor to the window 10 showing the structure 18, the user can move the attribute editor window so that it overlaps a portion of the structural window 10. FIGS. 5A and 5B show another example of the user dragging a window 10 with a toolbar from the first window group 12 to the second window group 12. In both cases, the system forms a lightweight shell around the second window group 12, providing a visual cue of the existence of the second window group 12 and its capabilities.

Figure 6:
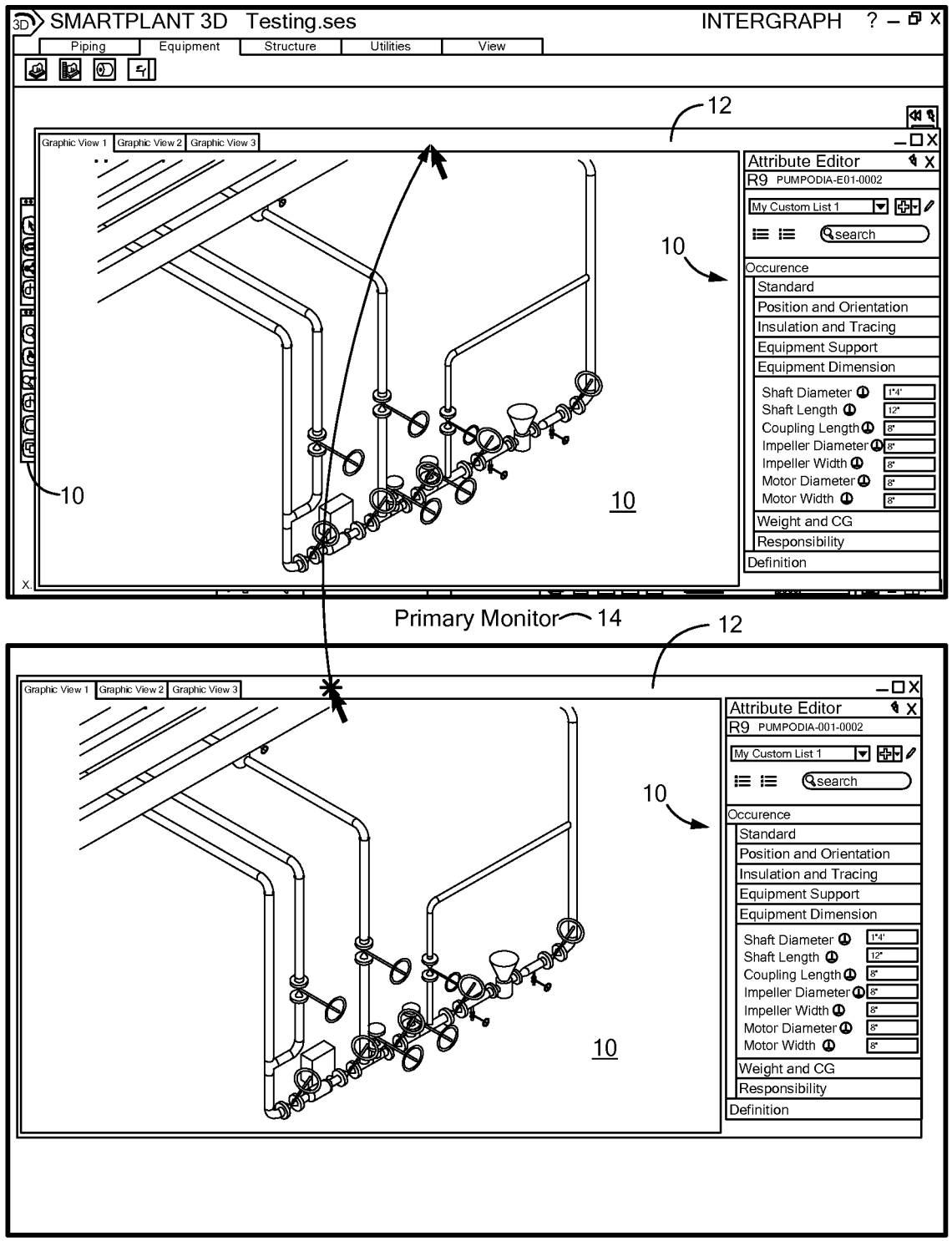
FIG. 6 schematically shows a multi-monitor system executing the method of FIG. 1 and demonstrating how multiple windows in one window group can be dragged as a single unit (step 104).

FIG. 6 schematically shows how a single window group 12 can be manipulated as if it were a single window 10. Specifically, in this case, the user drags the second window group 12 from the second monitor 16 to the primary monitor 14. To drag the entire window group 12 and not just a single window 10, the user selected and held a prescribed portion of the window group 12—in this case, a solid region near the boundary of the window group 12.

Although not shown, the user also may drag the same window group 12 back to the second monitor 16, minimize that window group 12, or maximize that window group 12. It should be reiterated, however, that although primary and second monitors 14 and 16 are shown in this example, some embodiments may simply form the two window groups 12 across a single monitor—preferably across a monitor having a large display area. In other words, two or more window groups 12 each may be positioned on different regions of the same monitor. Among other ways, those window groups 12 may be spaced apart, abutting, or overlapping.

Like many builder applications, illustrative embodiments manage and process the visual indicia and structure 18 in the various windows 10 using a common database (not shown). Specifically, the builder application has a single database containing some or all of the data relating to the structure 18 being processed. For example, the database may store information relating to the piping, the equipment, the structure, the utilities, views, etc., and attributes thereof. Among other things, the attributes may include the dimensions, materials, positions of each part, timing for installation, etc.

Figure 7A:
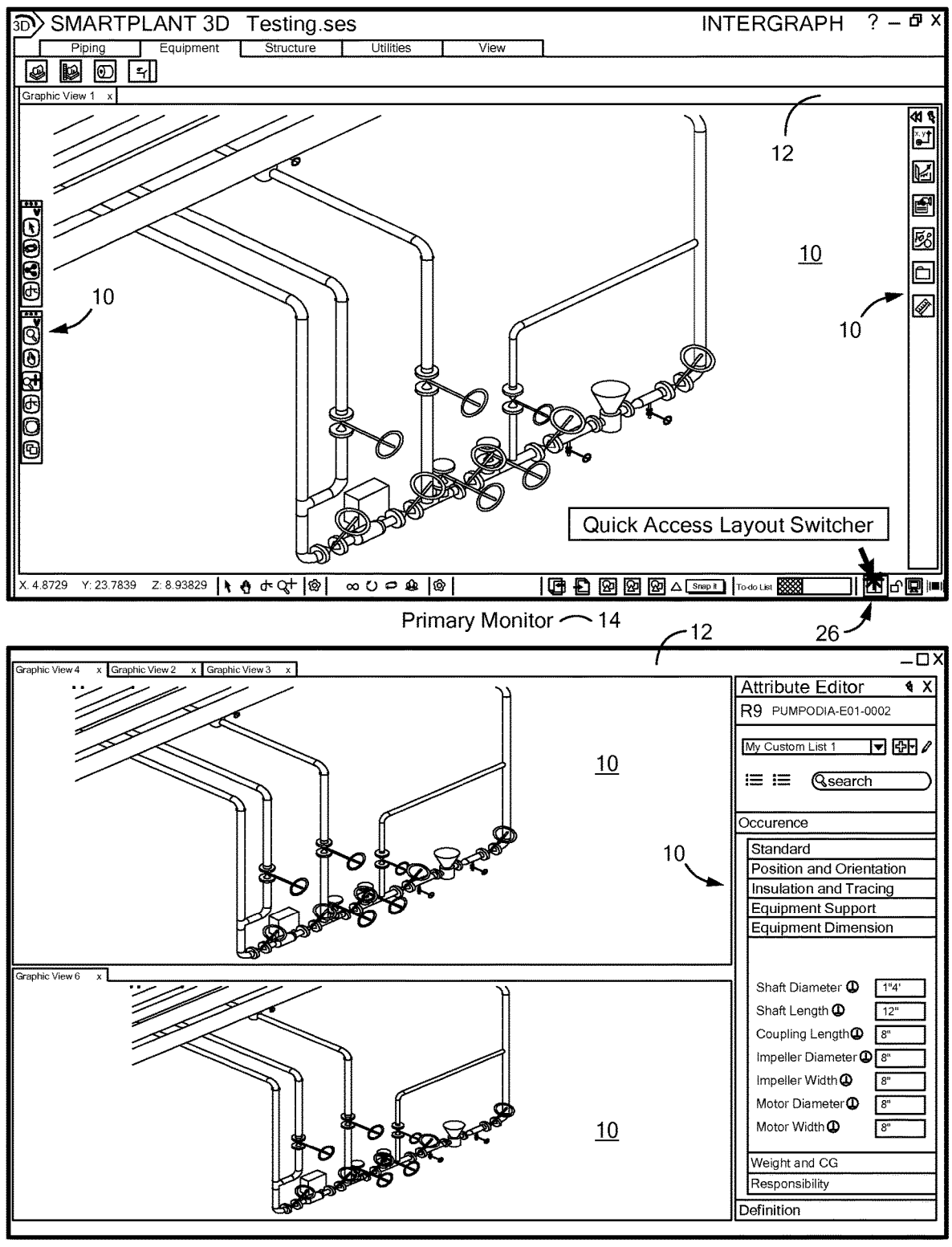
FIGS. 7A-7D schematically shows a multi-monitor system executing the method of FIG. 1 and demonstrating how layouts can be saved and recalled (e.g., steps 106-110).

Illustrative embodiments execute a single instance of the builder application, which displays the windows 10 across two or more window groups 12. For example, FIG. 7A shows two window groups 12 across the primary and second monitors 14 and 16. The primary monitor 14 shows one view of the structure 18, while the second monitor 16 shows two additional views of the same structure 18. Like other window groups 12, the user may have formed the window group 12 on the second monitor 16 by dragging the two structural windows 10 to that window group 12. A single instance of the builder application generates all three of those views of the structure 18.

Accordingly, a change to the appearance of any common feature of the structure 18 in one of the windows 10 necessarily changes the database displaying these multiple windows 10 across the different window groups 12. This database change therefore changes the outward appearance or views in the other windows 10 to the extent that they show that structural change. In other words, a change to the structure 18 in one of the windows 10 makes a corresponding change, if that change is viewable, in the other windows 10. Of course, if the user changes a structural portion that is not visible in a second window 10 or window group 12, then that change will not be displayed by the second window 10 or window group 12.

The inventors discovered that users of prior art systems were spending a great deal of time re-creating window group 12 layouts that they had previously generated. Illustrative embodiments avoid that difficulty by saving different layouts for future use. To that end, the process continues to step 106, which saves the layout currently displayed to memory. Those skilled in the art can use any of a number of different ways to save the layout. For example, one or both of the window groups 12 may have a specially designated "save button" (not shown) for saving a layout.

After the user selects the save button, the system may display a save window (not shown) having fields that enable the user to specify details of the layout. For example, the save window 10 may have fields for entering the name of the layout, the format of the layout, and other relevant information. The user then may continue processing the structure 18.

The process continues to step 108, in which the user may change the layout currently displayed across the multiple window groups 12. For example, the user may drag one window 10 from the first window group 12 to the second window group 12, and then further process the structure 18 represented in the window group 12. Next, if the user decides to change the layout back to a prior saved layout, he can select a layout from any of the plurality of saved layouts (step 110).

Figure 7B:
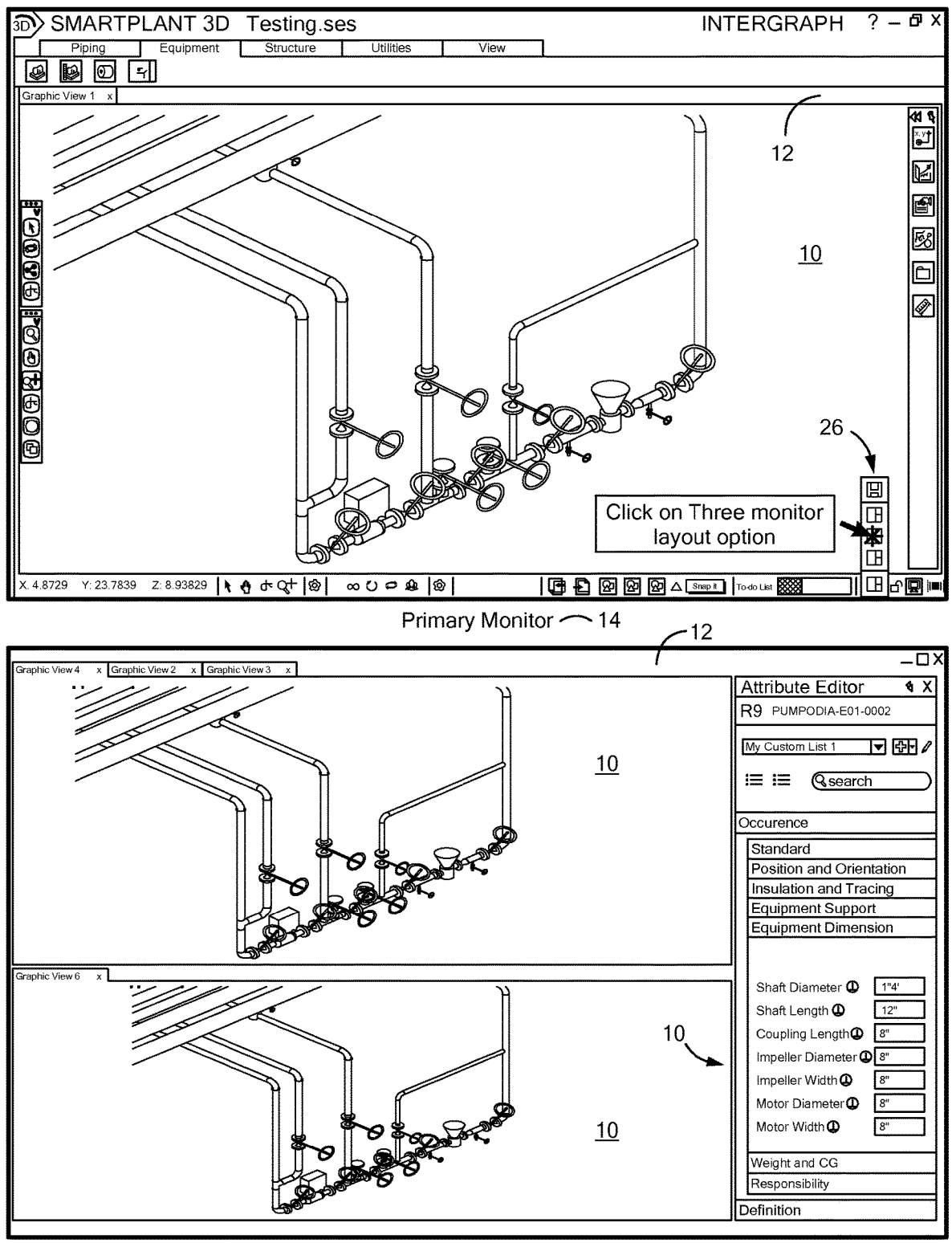

To that end, FIG. 7A shows an embodiment in which the system has a set of layout buttons 26 that permit the user to select between different layouts. Specifically, the embodiment shown in FIG. 7A displays the set of layout buttons 26 in a collapsed format. Selection of the collapsed layout buttons 26 produces a plurality of individual layout buttons 26 as shown in FIG. 7B. This plurality of layout buttons 26 may be a part of one of the existing windows 10, or a separate independent window 10 that can be moved between window groups 12.

Figure 7C:
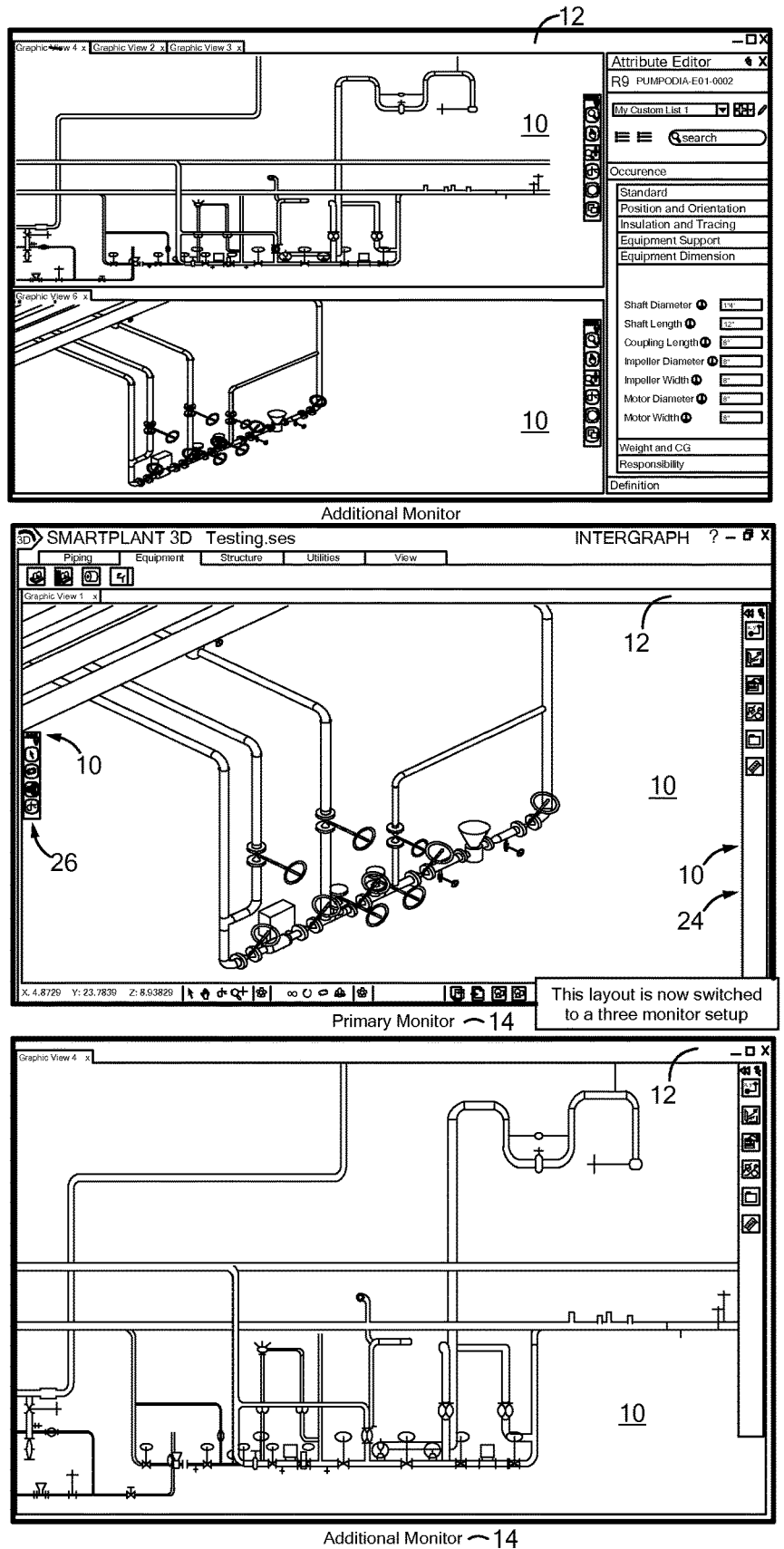

In the example shown, the saved layouts are formatted for two monitors, or three monitors. In FIG. 7B, the user selects a three monitor layout button 26, which causes the system to display window groups 12 across three monitors as shown in FIG. 7C. Each of these window groups 12 may have different formats or the same format. For example, the top window group 12 has two windows 10 showing the structure 18 and a window 10 having an attribute editor, while the middle window group 12 has one window 10 showing the same structure 18 and two windows 10 displaying buttons 22 for manipulating the structure 18. The structure 18 shown in the middle window group 12 appears to be an enlarged version of the same view of the image as that shown in the lower window 10 in the top window group 12.

Figure 7D:
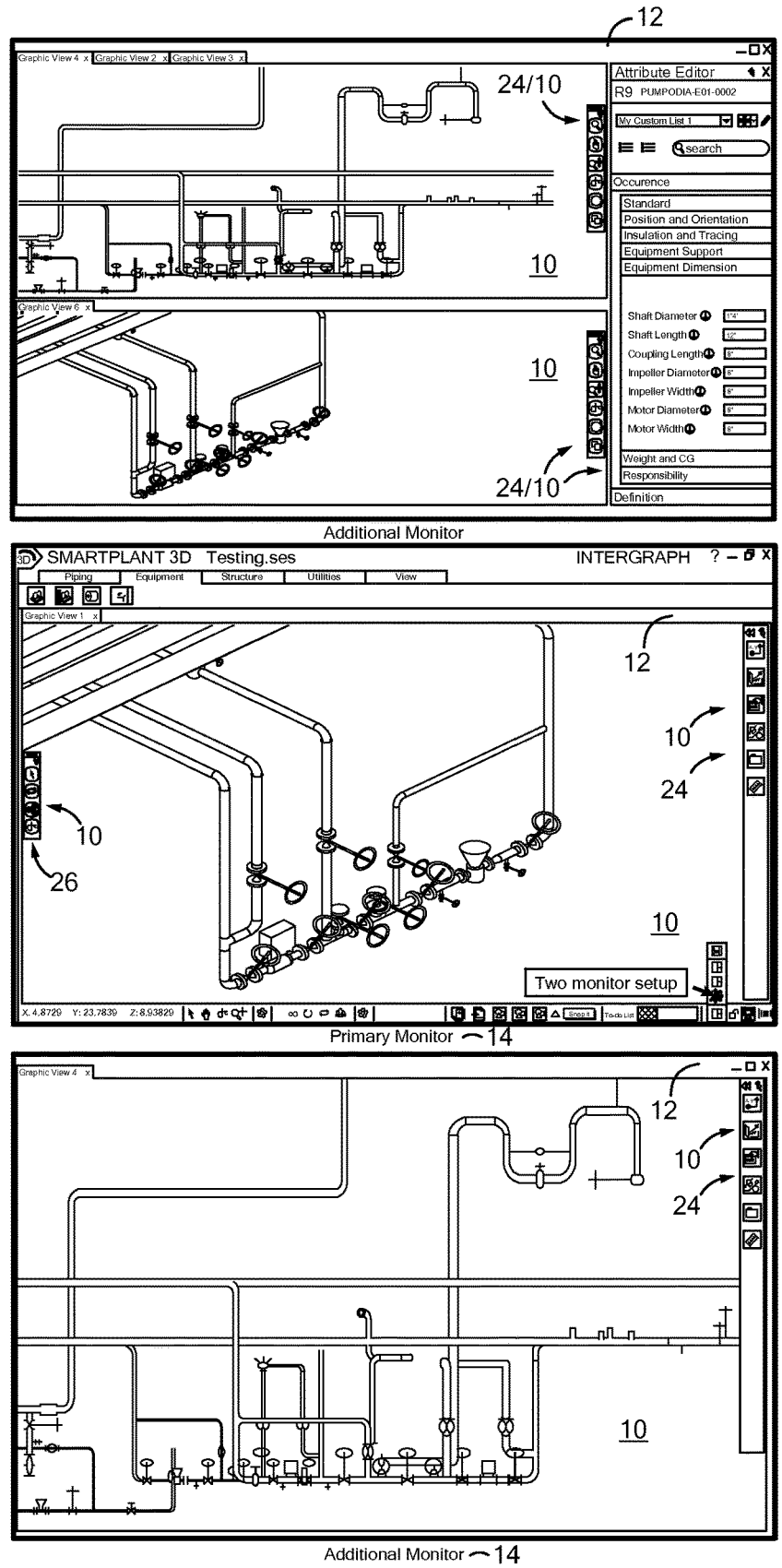

In a similar manner, the bottom window group 12 shows an enlarged version of the same structure 18 in the top window 10 of the top monitor. As noted above, a change to any one of those views produces a corresponding change to the other views to the extent that change can be shown. For example, a user may use the attribute editor window 10 to remove one section of the structure 18. Accordingly, in a corresponding manner, that same section of that structure 18 in the other window groups 12 also will be removed. To switch back to the two monitor view of FIG. 7A, the user selects a corresponding two monitor layout button 24 as shown in FIG. 7D.

Accordingly, illustrative embodiments provide a user with a more intuitive user interface to control the windows 10 and overall system, simplifying use of the builder application.

Figure 8:
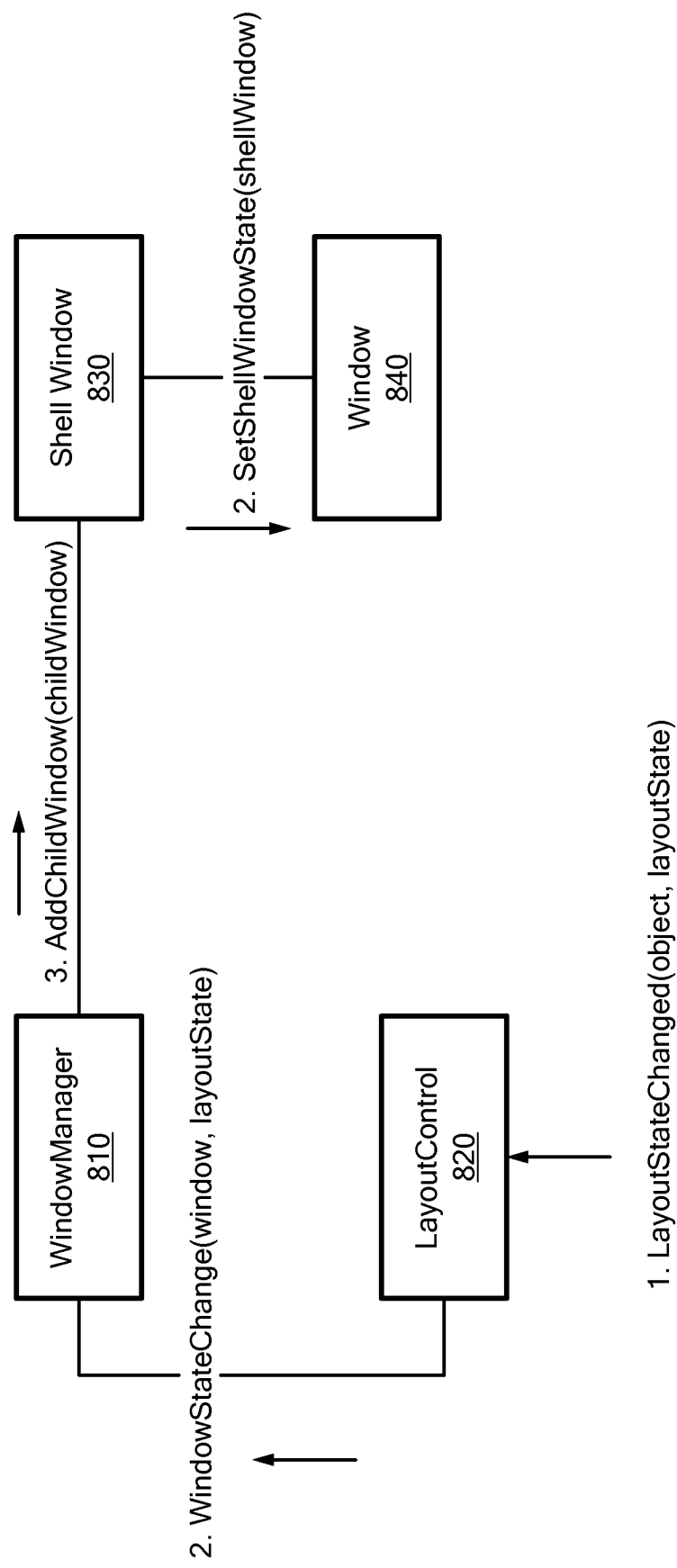
FIG. 8 schematically shows the logical flow for the creation of a window group and relating a plurality of window groups with a single application program.

FIG. 8 schematically shows the logical flow for the creation of a window group and relating a plurality of window groups with a single application program according to one embodiment of the invention. The LayoutControl component 820 receives as input a request for changing the location of a window 840. For example, a user may drag a window from a first window group that contains the main application shell and designate that the window should be in a second window group through a designated key stroke or selection of a button or other form of input. This triggers an event notification to handle a window state change event for the window being moved. The window manager 810 receives this request and updates the number of window groups that are associated with the present application. It should be recognized that a component may be a process or software code that is executed on a computer processor to cause the computer processor to perform the requested actions or a component may be hardware or a combination of hardware and software that can implement the methodology. Provided below is pseudo code showing the event notification to handle a window state changed event for the window being moved. It should be understood by one of ordinary skill in the art that all of the presented pseudo code is meant to be exemplary and should not be construed as limiting the invention as claimed to the specific pseudo code or the specific methodology shown in the pseudo code.

```
LayoutStateChanged(object layoutObject, LayoutState layoutState)
{
    if (layoutObject is Window && layoutState == Moved)
    {
        WindowManager.HandleStateChange((Window)layoutObject,
layoutState);
    }
}
WindowManager.WindowStateChanged
    The window manager component 810 reacts to the window state
change and checks to see if a new shell 830 is required.
    WindowStateChanged(Window window, LayoutState layoutState)
    {
    string monitorSpaceName;
    if (layoutState.ChangeType == Moved &&
MovedToNewMonitorSpace(window.Location, out monitorSpaceName))
    {
        ShellWindow shellWindow = new
ShellWindow(monitorSpaceName);
            shellWindow.AddChildWindow(window);
            AddShell(shellWindow);
    }
    }
```

In another embodiment, a user can drag a window from a first window group to a second window group that has already been established. Thus, the window becomes part of the second windows group space and the window is added to the existing shell of the second group.

This scenario essentially uses the same diagram as above (FIG. 8), but the interactions and details of the pieces change relative to the state change being processed. In this case, adding to an existing shell window (i.e. a window group) 830 instead of creating a new window group. Provided below is pseudo code that shows an example of the communications between components (i.e. the LayoutControl Component 820 and the WindowManager Component 810).

```
LayoutControl.LayoutStateChanged
LayoutStateChanged(object layoutObject, LayoutState layoutState)
{
    if (layoutObject is Window && layoutState.ChangeType ==
    Dropped)
    {
        WindowManager.HandleStateChange((Window)layoutObject,
layoutState);
    }
}
WindowManager.WindowStateChanged
```

In this example, the window manager component 810 is responsible for reacting to the window state change, checking to see if the child (window) is valid in the context of the container window, and if so adding it to the shell window for the defined window group by sending the request to the shell window component 830.

```
WindowStateChanged(Window window, LayoutState layoutState)
{
    if (layoutState.ChangeType == Dropped &&
layoutState.ContainerDroppedInto != null
        && layoutState.ContainerDroppedInto is ShellWindow)
    {
        ShellWindow shell =
```

-continued

```
(ShellWindow)layoutState.ContainerDroppedInto;
    If (VerifyValidChildWindow(shell, window))
    {
        shell.AddChildWindow(window);
    }
  }
}
```

Figure 9A:
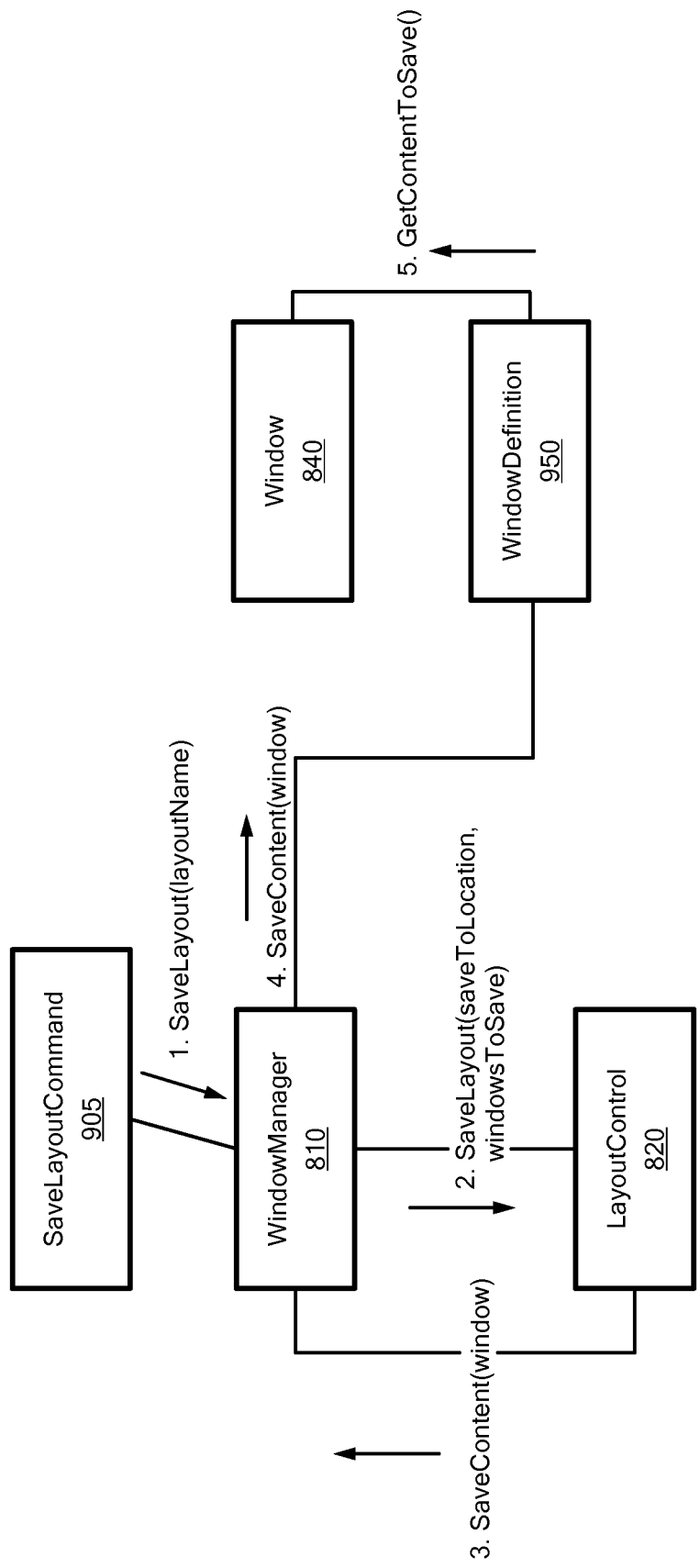
FIGS. 9a and 9b schematically shows the logical flow for the saving and loading of a layout that includes one or more window groups.
Figure 9B:
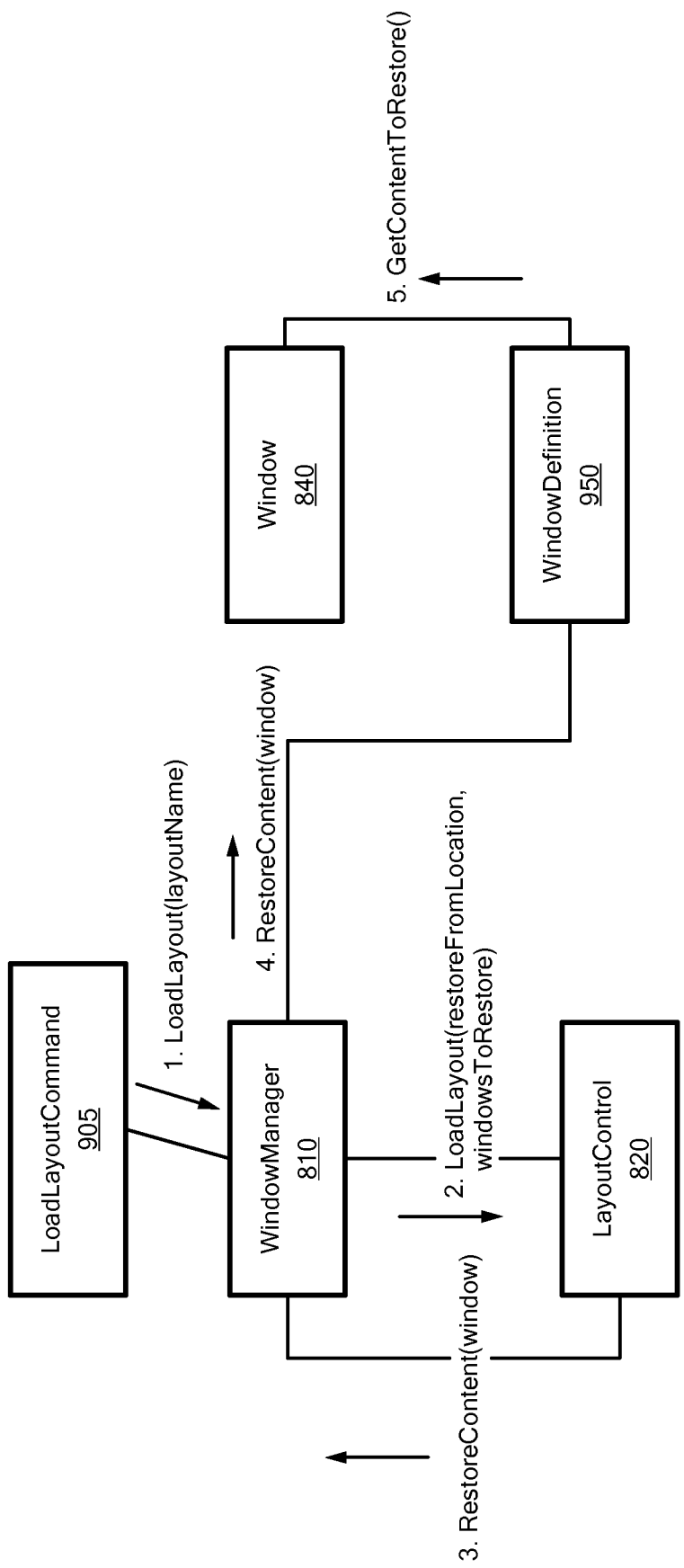

FIGS. 9A and 9B schematically show the logical flow for the saving and loading of a layout that includes one or more window groups. After initializing one or more windows groups using a window manager component 810 and arranging the windows within the windows groups on one or more monitors, the computer implemented methodology allows the layout to be saved.

In FIG. 9A a user executes a SaveLayout( ) command to save a layout of the windows associated with one or more window groups. In this example, the command requests user input and receives as input a new layout name from the user. Entering of the layout name can be accomplished by selecting the layout name from a drop down list of existing layout names, by specifying a layout name in a dialog or text field within the workspace, or by another user interface input mechanism.

The save layout command is passed from the SaveLayoutCommand Component 905 to the window manager component 810, which oversaw initialization and creation of the window groups and the corresponding layout. The WindowManager component 810 manages all of the windows displayed by an application and uses the received layout name to cause memory to be allocated for storing the layout. The windows manager component 810 communicates with a plurality of other components (the layout control component 820 and the window definition component 950 for each window). The window definition component 950 requests and retrieves the data, scripts, files, graphics and other content for a window. The window manager 810 gathers information from the components (layout control, windows definition, and window components) for each window associated with the layout. As shown in FIG. 9A the windows manager 810 will send requests to and receive information from each component for each application window. Thus, the windows manager 810 will communicate at least an equal number of times as there are windows with each of the components. The windows manager 810 saves the gathered information as the layout.

The following pseudo code demonstrates the hierarchy of the commands and how a layout is saved including the information regarding the position and features of each window within the layout in one example of the invention.

```
        GetSaveLocationsFromLayoutName(layoutName, out
    saveLayoutTo, out saveDefinitionsTo)
            layoutControl.SaveLayout(saveLayoutTo,
    WindowManager.WindowsCollection)
                SaveWindowDefinitions(saveDefinitionsTo);
            WindowManager.SaveContent(window)
```

The WindowManager 810 saves the windows definition of the current window such that the window and its content may be recreated and placed within the layout.

```
    windowDefinition = GetWindowDefinitionForWindow(window)
        windowDefinition.SaveContent(window)
LayoutControl.SaveLayout(saveLocation, windowsCollection)
```

The LayoutControl component 820 manages the layout of the windows within the application. This component stores information including the size and location (which would include the specific window group and its corresponding size and location) of the application windows.

```
    For each(Window windowToSave in windowsCollection)
    {
        SaveLayoutForWindow(windowToSave);
        WindowManager.SaveContent(windowToSave);
    }
    WindowDefinition.SaveContent(window)
```

The WindowDefinition component 950 contains and provides the information required to restore a window such that it can be re-created for the layout being saved including the window type and the contents that are to be placed within the window 840.

```
    Id = window.Id
    WindowType = window.Type
    WindowContent = window.GetContentToSave( )
```

9B schematically show the logical flow for loading of a layout that includes one or more window groups.

First, a user executes a LoadLayoutCommand by selecting a layout to load. The user may select the layout from a drop down list, from specifying a layout name in a dialog or text field on the UI, or other UI input mechanism. Provided below is pseudo code for causing a layout to be loaded and presented on one or more monitors for one or more window groups.

```
            windowManager.LoadLayout(layoutName)
        WindowManager.LoadLayout(layoutName)
```

This pseudo code provided below loads the given layout as the layout for the running application, including the details of the layout of the windows, as well as the definitions of the content of the windows within the layout and the location, position and associated application windows for each window group.

```
        GetLoadLocationsFromLayoutName(layoutName, out
    loadLayoutFrom, out loadDefinitionsFrom)
            LoadWindowDefinitions(loadDefinitionsFrom);
            layoutControl.LoadLayout(loadLayoutFrom)
        WindowManager.RestoreContent(window)
```

The WindowManager component 810 restores each window within the layout using the saved window definition from the window definition component 950 such that the window and its content may be recreated and placed within the layout being loaded.

```
    windowDefinition = GetWindowDefinitionForWindow(windowId)
        window = windowDefinition.RestoreContent(windowId)
    return window;
LayoutControl.LoadLayout( )
```

The LayoutControl component 820 manages the layout of the windows within the application. This is used to store information for example for the size and location (which would include window group size and location) of the application windows.

```
Foreach(LayoutDefinition layout in LayoutDefinitions)
{
    window =
WindowManager.RestoreContent(layout.WindowId);
        RestoreLayoutForWindow(window);
}
WindowDefinition.RestoreContent(window)
```

The WindowDefinition component 950 contains the information required to restore a window such that it can be re-created for the layout being saved.

```
        window = CreateWindowFromDefintion(Id, WindowType,
WindowContent)
    return window;
```

It should be recognized that the above saving and restoring of the layout takes into account the specific monitor configuration and the layout is preferably recalled on the same machine or type of machine with the same monitor configuration. However, the layout may be adapted to other configurations. For example, the system may be configured to present a layout that has been created for a two monitor system and the layout may be recalled on a large scale single monitor (27" or 32" monitor). The software would attempt to approximate the desired layout. For example, the window manager may determine the total pixel count for the displays of the original layout and map the layout to the single model version pixel by pixel. Alternatively, the window manager may subdivide the single large scale monitor into two viewing regions and associate each region with a different monitor from the layout. Thus, the layout can be adapted to different configurations and sizes of monitors.

Figure 10:
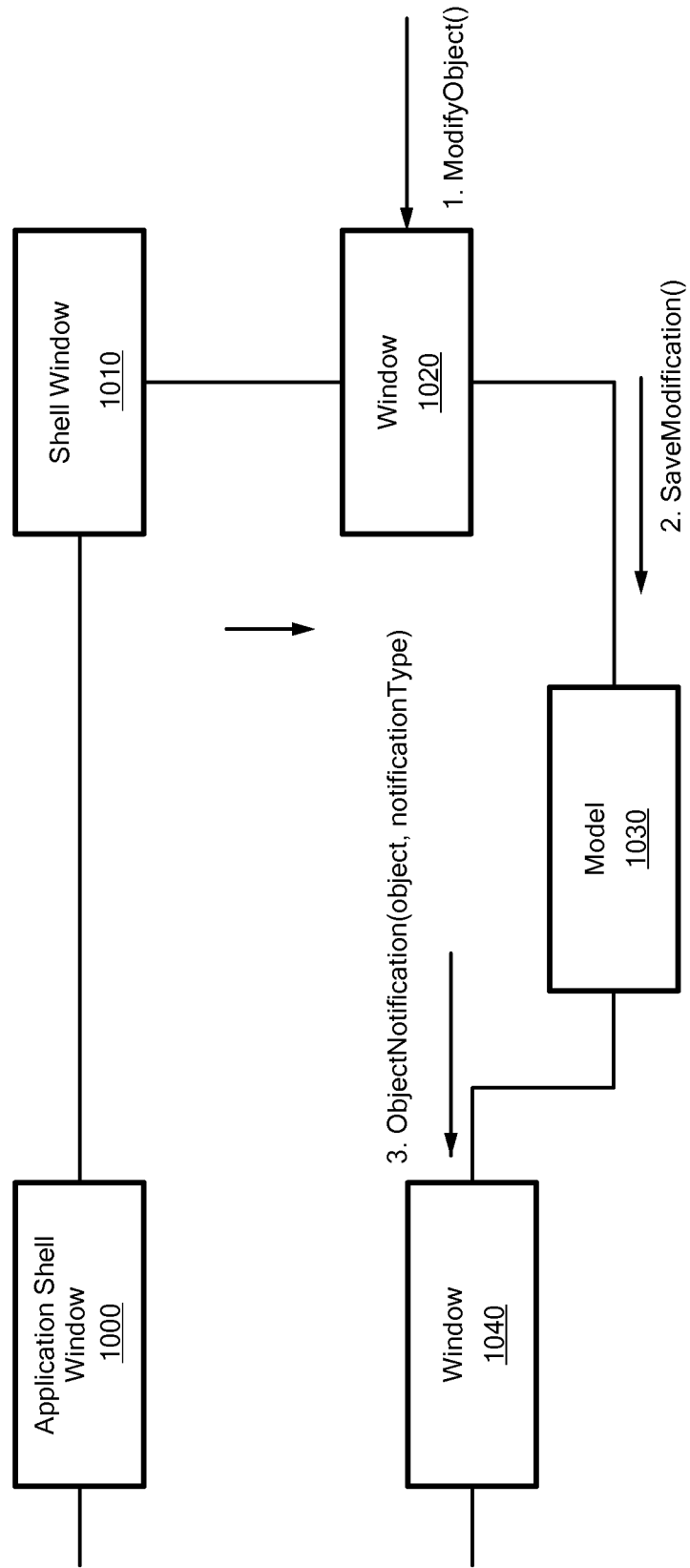
FIG. 10 is a schematic diagram showing the interaction of components during the synchronization between the application model and the individual application windows.

FIG. 10 is a schematic diagram showing the interaction of components during the synchronization between the application model and the individual application windows. As shown, the overall application includes a shell window 1000. Each window within the shell window is part of the same window group. Additionally as shown, there is a second shell window that defines a second window group 1010. When a user interacts with a window to modify content or an object within the window, the application model is modified. A model is the where the objects are stored that are displayed by the application. The various windows within the application show information on the objects in the model and at various points allow those objects to be created and modified.

The window component 1020 causes a modification command to be sent to the model 1030. The model in turn, communication through an objectnotification(object, notificationtype) that one or more objects in a window have changed. This information is sent to the other window components, such as windows component 1040. This information allows each of the windows to be updated and kept synchronized with other windows that show the same object.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of displaying objects of a builder application, the method comprising:
    executing a builder application on a computer system, the builder application being configured to generate a plurality of application windows, at least one of the application windows having a main window including indicia representing an object of something being developed by the builder application and a toolbar or palette that enables manipulation of the indicia;
    providing a user interface allowing user creation of window groups;
    receiving, via the user interface, user input instructing creation of a plurality of window groups including at least a first window group and second window group;
    creating the first and second window groups in response to the user input, the first window group including at least first and second application windows, wherein the first application window contains the indicia representing the object and the second application window contains the toolbar or palette that enables manipulation of the indicia in the first application window from the second application window;
    displaying the first and second application windows in the first window group on one or more monitors, wherein the first application window contains the indicia representing the object and the second application window contains the toolbar or palette that enables manipulation of the indicia in the first application window from the second application window; and
    receiving a user input dragging one of the first and second application windows from the first window group into the second window group to produce a given layout comprising the first and second window groups, the other of the first and second application windows remaining in the first window group, such that the first application window containing the indicia and the second application window containing the toolbar or palette are in separate window groups and the toolbar or palette in one window group enables manipulation of the indicia in the other window group, the two application windows being produced by a single instance of the builder application.

2. The method as defined by claim 1 further comprising: saving the first and second window groups in memory such that the first and second window groups can be recalled for display on the one or more monitors.

3. The method as defined by claim 2 further comprising: displaying prescribed indicia on the one or more monitors which, when selected by the user, causes recall of the first and second window groups from memory for display on the one or more monitors.

4. The method as defined by claim 1 wherein the one or more monitors comprises a first monitor and a second monitor, the first window group comprising the first monitor, the second window group comprising the second monitor.

5. The method as defined by claim 1 wherein the user input via the user interface comprises at least one of a key press, a key combination, a mouse click, a position on a screen, a region of a screen, a size of the window group, or user selection of a choice.

6. The method as defined by claim 1 further comprising a given database having information relating to the given layout, the two application windows being displayed using data from the given database.

7. The method as defined by claim 1 further comprising displaying two application windows that display a common object and changing the appearance of the object on the first application window, the appearance of the object also changing in the second application window without additional user action.

8. The method as defined by claim 1 further comprising dragging a third application window into the second window group to produce a new layout having a plurality of application windows, the application windows of the second window group being grouped into a single unit.

9. The method as defined by claim 1 further comprising displaying at least one of a shell circumscribing the first window group or a shell circumscribing the second window group.

10. The method as defined by claim 1 wherein each window group is configured to collapse and expand all its application windows at the same time.

11. The method as defined by claim 1 wherein each window group is configured to permit a user to drag all its application windows in a single cursor movement.

12. The method as defined by claim 1 wherein the builder application includes an application to build a structure, the object including at least a component of the structure.

13. The method as defined by claim 1 wherein each window group is configured to permit a user to drag all its application windows in a single cursor movement without changing their positions relative to each other.

14. A computer program product on a tangible non-transitory medium having computer program code for displaying objects of a builder application, the computer code comprising:

computer code for executing a builder application on a computer system, the builder application being configured to generate a plurality of application windows, at least one of the application windows having a main window including indicia representing an object of something being developed by the builder application and a toolbar or palette that enables manipulation of the indicia;

computer code for providing a user interface allowing user creation of window groups;

computer code for receiving, via the user interface, user input instructing creation of a plurality of window groups including at least a first window group and second window group;

computer code for creating the first and second window groups in response to the user input, the first window group including at least first and second application windows, wherein the first application window contains the indicia representing the object and the second application window contains the toolbar or palette that enables manipulation of the indicia in the first application window from the second application window;

computer code for displaying the first and second application windows in the first window group on one or more monitors, wherein the first application window contains the indicia representing the object and the second application window contains the toolbar or palette that enables manipulation of the indicia in the first application window from the second application window; and computer code responsive to a user dragging one of the first and second application windows from the first window group into the second window group to produce a given layout comprising the first and second window groups, the other of the first and second application windows remaining in the first window group, such that the first application window containing the indicia and the second application window containing the toolbar or palette are in separate window groups and the toolbar or palette in one window group enables manipulation of the indicia in the other window group, the two application windows being produced by a single instance of the builder application.

15. The computer program product as defined by claim 14 further comprising:

computer code for saving the first and second window groups in memory such that the first and second window groups can be recalled for display on the one or more monitors.

16. The computer program product as defined by claim 15 further comprising:

computer code for displaying prescribed indicia on the one or more monitors which, when selected by the user, causes recall of the first and second window groups from memory for display on the one or more monitors.

17. The computer program product as defined by claim 14 wherein the one or more monitors comprises a first monitor and a second monitor, the first window group comprising the first monitor, the second window group comprising the second monitor.

18. The computer program product as defined by claim 14 wherein the user input via the user interface comprises at least one of a key press, a key combination, a mouse click, a position on a screen, a region of a screen, a size of the window group, or user selection of a choice.

19. The computer program product as defined by claim 14 further comprising:

computer code for receiving user interaction for changing the appearance of the object in the first application window; and computer code responsive to the user interaction changing the appearance of the object in a third application window without additional user action.

20. The computer program product as defined by claim 14 further comprising:
   computer code responsive to a user dragging a third application window into the second window group forming a new layout having a plurality of application windows, the application windows of the second window group being grouped into a single unit.

21. The computer program product as defined by claim 14 further comprising:
   computer code for displaying at least one of a shell circumscribing the first window group or a shell circumscribing the second window group.

22. The computer program product as defined by claim 14 wherein the computer code is configured to collapse and expand all application windows for a window group at the same time.

23. The computer program product as defined by claim 14 wherein the computer code permits a user to drag all application windows in a window group as a single unit.

* * * * *